(12) United States Patent
Matsumura

(10) Patent No.: US 10,122,006 B2
(45) Date of Patent: Nov. 6, 2018

(54) CONNECTION MODULE

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventor: Nobuyuki Matsumura, Mie (JP)

(73) Assignees: AutoNetworks Technologies, Ltd., Yokkaichi, Mie (JP); Sumitomo Wiring Systems, Ltd., Yokkaichi, Mie (JP); SUMITOMO ELETRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/866,679

(22) Filed: Jan. 10, 2018

(65) Prior Publication Data

US 2018/0212225 A1 Jul. 26, 2018

(30) Foreign Application Priority Data

Jan. 20, 2017 (JP) .................................. 2017-008106

(51) Int. Cl.
*H01M 2/20* (2006.01)
*H01M 2/10* (2006.01)
(Continued)

(52) U.S. Cl.
CPC ............. *H01M 2/206* (2013.01); *H01M 2/04* (2013.01); *H01M 2/1077* (2013.01); *H01M 2/22* (2013.01);
(Continued)

(58) Field of Classification Search
CPC .. H01M 2/206; H01M 10/4207; H01R 11/288
See application file for complete search history.

(56) References Cited

U.S. PATENT DOCUMENTS 5,541,380 A * 7/1996 Ogden ................... H01R 11/12
219/56
6,293,803 B1 * 9/2001 Rust ..................... H01R 13/533
174/69
(Continued)

FOREIGN PATENT DOCUMENTS

JP 2002164034 A 6/2002

*Primary Examiner* — Ross Gushi
(74) *Attorney, Agent, or Firm* — REISING ETHINGTON, P.C.

(57) ABSTRACT

A connection module according to which positional movement of each housing unit can be performed independently and sagging can be suppressed. A connection module that is to be attached to a power storage element group formed by aligning multiple power storage elements includes: bus bars that are to be connected between electrode terminals of the power storage elements; multiple box-shaped housing units that insulate and house the bus bars; and multiple U-springs that are provided between a pair of opposing wall portions of adjacent housing units and that couple the adjacent housing units such that the distance between the adjacent housing units can extend and contract. The U-springs each include a U-portion and a pair of base end portions that are located on both ends of the U-portion and connect to the pair of wall portions. The multiple U-springs include at least two U-springs whose pairs of base end portions are at different positions in a height direction.

6 Claims, 7 Drawing Sheets

(51) Int. Cl.
- *H01M 2/04* (2006.01)
- *H01M 2/22* (2006.01)
- *H01M 10/48* (2006.01)
- *H01R 11/28* (2006.01)
- *H01M 10/42* (2006.01)
- *H01M 2/30* (2006.01)

(52) U.S. Cl.
CPC ......... *H01M 2/30* (2013.01); *H01M 10/4207* (2013.01); *H01M 10/482* (2013.01); *H01R 11/288* (2013.01); *H01M 2/1083* (2013.01); *H01R 11/289* (2013.01)

(56) References Cited

U.S. PATENT DOCUMENTS

| | | | | |
|---|---|---|---|---|
| 7,270,576 B2* | 9/2007 | Kim | ............. | H01M 2/206 429/158 |
| 7,294,020 B2* | 11/2007 | Zhao | ............. | H01R 11/28 439/627 |
| 7,507,124 B2* | 3/2009 | Kim | ............. | H01R 11/288 439/510 |
| 7,601,457 B2* | 10/2009 | Byun | ............. | H01M 2/202 429/121 |
| 8,133,607 B1* | 3/2012 | Chen | ............. | H01M 2/1077 320/112 |
| 8,574,008 B2* | 11/2013 | Große | ............. | H01M 2/202 439/627 |
| 8,632,369 B2* | 1/2014 | Lee | ............. | H01G 9/26 439/766 |
| 8,721,368 B2* | 5/2014 | Zhao | ............. | H01M 2/206 439/350 |
| 9,136,039 B2* | 9/2015 | Diez | ............. | H01M 2/202 |
| 9,136,617 B2* | 9/2015 | Sakae | ............. | H01M 2/206 |
| 9,590,223 B2* | 3/2017 | Zhang | ............. | H01R 13/533 |
| 2004/0166727 A1* | 8/2004 | Ling | ............. | H01M 2/202 439/507 |
| 2006/0270277 A1* | 11/2006 | Zhao | ............. | H01R 11/28 439/627 |
| 2006/0270286 A1* | 11/2006 | Zhao | ............. | H01M 2/206 439/840 |
| 2008/0063929 A1* | 3/2008 | Byun | ............. | H01M 2/202 429/121 |
| 2010/0266889 A1* | 10/2010 | Kim | ............. | H01M 2/0257 429/158 |
| 2011/0081568 A1* | 4/2011 | Kim | ............. | H01M 2/206 429/158 |
| 2011/0117420 A1* | 5/2011 | Kim | ............. | B23K 9/0026 429/158 |
| 2012/0100761 A1* | 4/2012 | Groe | ............. | H01M 2/202 439/774 |
| 2016/0329545 A1* | 11/2016 | Zhang | ............. | H01R 13/533 |
| 2017/0005314 A1* | 1/2017 | Miyawaki | ............. | H01M 2/0285 |
| 2017/0005317 A1* | 1/2017 | Schlemmer | ............. | B60L 11/1851 |
| 2017/0012274 A1* | 1/2017 | Narbonne | ............. | H01M 2/206 |
| 2017/0018794 A1* | 1/2017 | Lee | ............. | H01M 2/043 |
| 2017/0033332 A1* | 2/2017 | Sakai | ............. | H01M 2/10 |
| 2017/0125772 A1* | 5/2017 | Leung | ............. | H01M 2/206 |
| 2017/0214025 A1* | 7/2017 | Czechanowski | ............. | H01M 2/1077 |
| 2017/0288198 A1* | 10/2017 | Schmiedhofer | ............. | H01M 2/1294 |
| 2017/0288200 A1* | 10/2017 | Peng | ............. | H01R 31/06 |
| 2018/0198105 A1* | 7/2018 | Sato | ............. | H01M 2/10 |
| 2018/0205060 A1* | 7/2018 | Zhan | ............. | H01M 2/206 |
| 2018/0205061 A1* | 7/2018 | Zhan | ............. | H01M 2/206 |

\* cited by examiner

LU<LD

WD < WU

CONNECTION MODULE

CROSS REFERENCE TO RELATED APPLICATIONS

This application claims the priority of Japanese patent application JP2017-008106 filed on Jan. 20, 2017, the entire contents of which are incorporated herein.

TECHNICAL FIELD

The technique disclosed in the present specification relates to a connection module and specifically relates to a connection module that includes multiple housing units that separately insulate and house bus bars that connect electrodes of two adjacent power storage elements in a power storage element group.

BACKGROUND ART

Conventionally, for example, the technique disclosed in JP 2002-164034A has been known as a connection module including multiple housing units that separately house and insulate bus bars. JP 2002-164034A discloses a configuration in which divided plate bodies (housing units) can move independently with respect to the electrodes of a power storage element due to supporting wall portions (bendable portions) of the divided plate bodies being bent. With this configuration, when a battery connection plate (connection module) is attached to the power storage element group, misalignment caused by an allowance in the pitch between the electrodes of the two power storage elements or the like is absorbed so as to improve workability in the attachment task.

JP 2002-164034A is an example of background art.

However, in Patent Document 1 above, since a configuration is used in which the supporting wall portions of the divided plate bodies are integrated by common coupling walls, it could not be said that the positional movement of the individual divided plates can be performed completely independently for each divided plate. In other words, the movement ranges of the individual divided plates are restricted by the common coupling walls.

For this reason, although a method of independently providing bendable portions for the divided plate bodies is conceivable, at that time, if the bendable portions are constituted by synthetic resin, the rigidity of the bendable portions causes the divided plate bodies coupled by the bendable portions to curve due to the weight, and a phenomenon occurs in which one end of the connection module sags. This sagging phenomenon becomes more prominent as the number of divided plate bodies that are coupled increases. If this kind of sagging phenomenon occurs in a connection module, it will no longer be easy to handle the connection module during the task of attachment to the power storage element group, and the efficiency of the attachment task will be reduced.

The technique disclosed in the present embodiment has been completed based on the foregoing circumstance and provides a connection module according to which positional movement of each housing unit can be performed independently and sagging can be suppressed.

SUMMARY

The connection module disclosed in the present specification is a connection module that is to be attached to a single battery group formed by aligning a plurality of single batteries having positive and negative electrode terminals, including bus bars to be connected between the electrode terminals; a plurality of box-shaped housing units for insulating and housing the bus bars; and a plurality of U-springs that are provided between a pair of opposing wall portions of adjacent housing units, that are U-shaped in a side view, and that couple the adjacent housing units such that a distance between the adjacent housing units can extend and contract, wherein the U-springs each include a U-portion and a pair of base end portions that are located on both ends of the U-portion and connect to the pair of wall portions, and the plurality of U-springs include at least two U-springs in which the pairs of base end portions are at different positions in a height direction, in a side view in a state of being provided on the pair of wall portions.

According to the present configuration, the multiple U-springs serving as bendable portions are provided between the housing units. At this time, in a side view in a state of being provided on a pair of wall portions, the multiple U-springs include at least two U-springs whose pairs of base end portions are at different positions in the height direction. For this reason, for example, two downward U-springs having U-portions with openings that face downward are arranged shifted in the height direction on the wall portions of the housing units, and thus it is possible to prevent sagging of the multiple coupled housing units compared to the case in which one downward U-spring is provided on the wall portions. In other words, according to the present configuration, positional movement of each housing unit can be performed independently, and it is possible to suppress sagging of the one end portion of the connection module constituted by the multiple coupled housing units.

In the above-described connection module, the plurality of U-springs may include a downward U-spring in which the U-portion has an opening that faces downward, and an upward U-spring in which the U-portion has an opening that faces upward, in a plan view in a state of being provided on the pair of wall portions.

According to the present configuration, the multiple U-springs are constituted by including a downward U-spring with a U-portion having an opening that faces downward, and an upward U-spring with a U-portion having an opening that faces upward. Thus, due to the bendable portion being constituted by including a downward U-spring and an upward U-spring that are provided between the housing units, it is possible to suppress a case in which one end portion of the connection module sags without causing the U-springs to protrude in the vertical direction of the housing unit in a side view.

Also, in the above-described connection module, it is also possible to use a configuration in which a spring length of the downward U-spring may be longer than a spring length of the upward U-spring.

According to the present configuration, the spring length of the downward U-spring is made longer than the spring length of the upward U-spring, whereby the opening degree of the U-portion of the upward U-spring is smaller than the opening degree of the U-portion of the downward U-spring. Accordingly, it is possible to make the downward bending amount of the connection module smaller than the upward bending amount thereof. For this reason, sagging of the connection module can be further suppressed.

Also, in the above-described connection module, it is also possible to use a configuration in which a spring width of the upward U-spring may be wider than a spring width of the downward U-spring.

According to the present configuration, the spring width of the upward U-spring is made wider than the spring width of the downward U-spring, whereby the spring strength (force with which the opening degree of the U-portion is maintained) of the upward U-spring becomes stronger than the spring strength of the downward U-spring, and the opening degree of the U-portion of the upward U-spring becomes smaller than the opening degree of the U-portion of the downward U-spring. Accordingly, it is possible to make the downward bending amount of the connection module smaller than the upward bending amount thereof. For this reason, sagging of the connection module can be further suppressed.

Also, in the above-described connection module, it is also possible to use a configuration in which the upward U-spring is provided on both end portions on the wall portions in plan view, and one said downward U-spring is provided at a central portion of the wall portions in plan view.

According to the present configuration, in a configuration with three U-springs, which is a small number of U-springs, it is possible to suppress bending in the twisting direction of the multiple coupled housing units, and to suppress sagging of the connection module.

Also, in the above-described module, the plurality of U-springs may be arranged such that the positions of the base end portions connected to the wall portions are symmetrical with respect to a center line in the height direction of the wall portions.

According to the present configuration, since the multiple U-springs are arranged symmetrically, bending in the twisting direction of the multiple coupled housing units can be suppressed.

According to the connection module disclosed in the present specification, positional movement of each housing unit can be performed independently, and sagging can be suppressed.

EMBODIMENTS

Embodiment

An embodiment of the present design will be described with reference to FIGS. 1 to 8.

Figure 1:
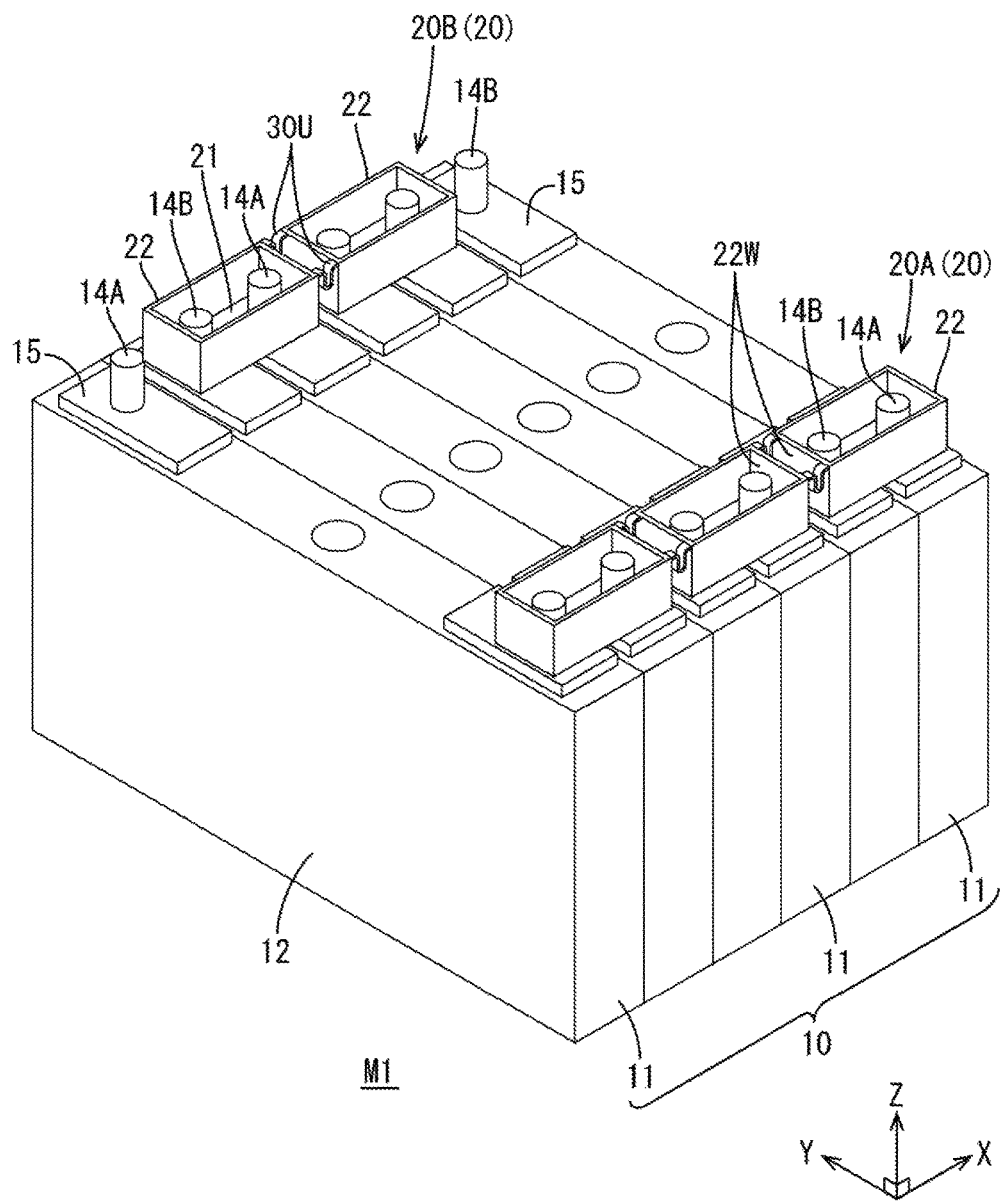
FIG. 1 is a perspective view showing a power storage module that includes a connection module according to an embodiment.

As shown in FIG. 1, a power storage module 1 includes a connection module 20 of the present embodiment and a power storage element group 10 formed by aligning multiple power storage elements 11.

For example, the power storage module M1 is used as a driving source for a vehicle such as an electric automobile or a hybrid automobile. Also, in the description below, if there are multiple identical members, one member is denoted by a reference numeral and the reference numerals and description of the other members are omitted in some cases.

Figure 2:
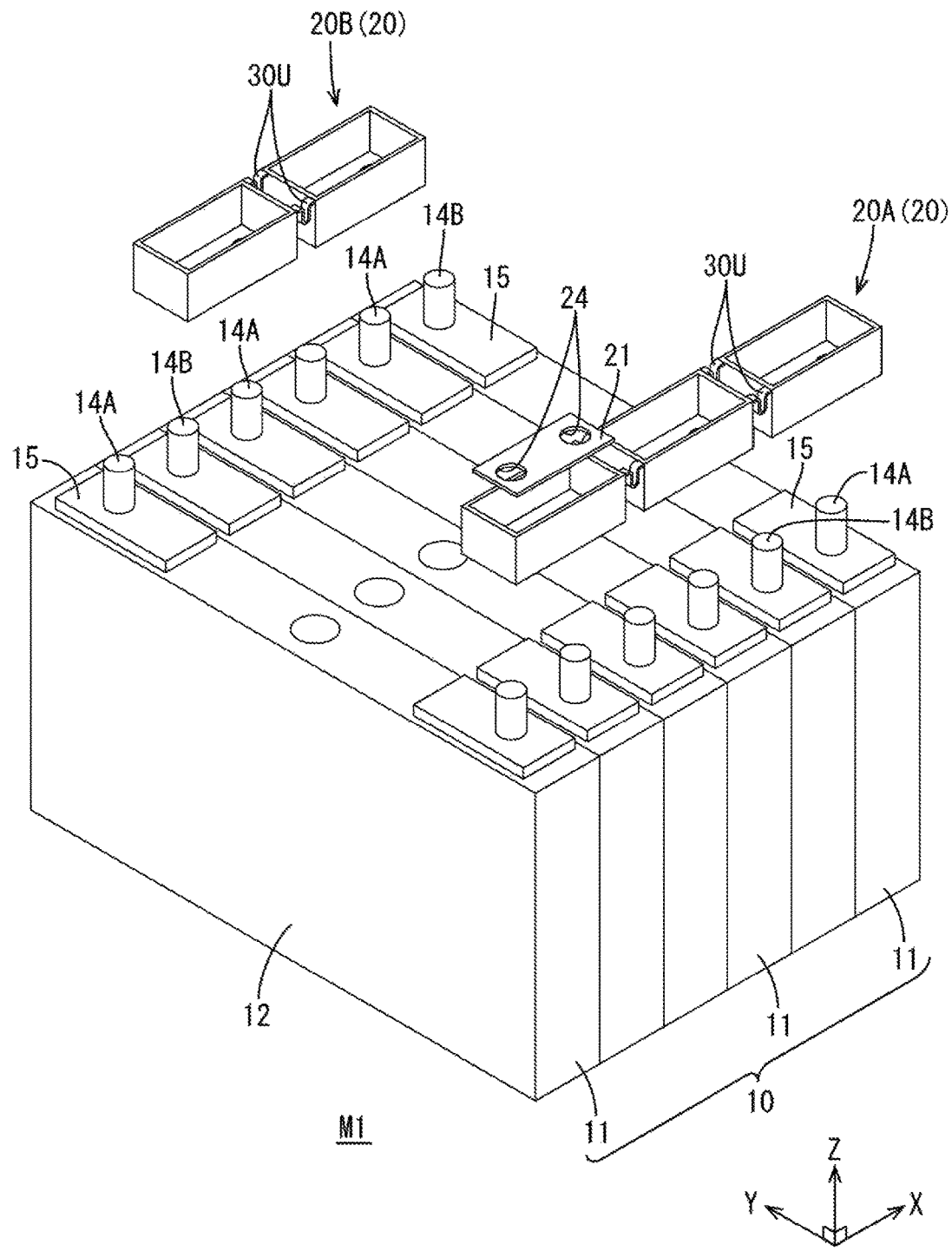
FIG. 2 is an exploded perspective view of the power storage module according to FIG. 1.

The power storage element group 10 to which the connection module 20 of the present embodiment is attached is constituted by aligning multiple (in the present embodiment, six) power storage elements 11 as shown in FIGS. 1 and 2.

The power storage elements 11 each include a positive electrode terminal 14A and a negative electrode terminal 14B that protrude orthogonally from the upper surface of a flat, cuboid main body portion 12 inside of which a power storage element (not shown) is housed.

The electrode terminals 14 are inserted into terminal insertion holes 24 (see FIG. 2) of bus bars 21. Screw threads (not shown) onto which nuts are screwed are formed on the side wall portions of the electrode terminals 14. Note that the negative electrode terminal 14B on the rear side (arrow Y side) of the power storage element 11 located on the right end (end on the arrow X side) in FIG. 1 is an externally-connected anode terminal, and the positive electrode terminal 14A on the rear side (arrow Y side) of the power storage element 11 located on the left end in FIG. 1 is an externally-connected cathode terminal.

The bus bars 21 into which the electrode terminals 14 are inserted come into contact with terminal platforms 15 of the power storage elements 11, whereby the bus bars 21 and the electrode terminals 14 are electrically connected. The multiple power storage elements 11 are arranged such that the polarities of electrode terminals 14 that are adjacent in the left-right direction (the direction of arrow X) in FIG. 1 are opposite.

As shown in FIGS. 1 and 2, the connection module 20 is attached to the power storage element group 10 in the alignment direction of the power storage elements 11 (direction of arrow X), and the connection module 20 includes a function of electrically connecting the multiple power storage elements 11.

The connection module 20 includes a first connection module 20A that is attached to an electrode terminal line on the right side of the power storage element group 10, and a second connection module 20B that is attached to an electrode terminal line on the left side (direction of arrow Y) of the power storage element group 10. Note that in the descriptions that apply to both of the connection modules 20A and 20B, the connection modules 20A and 20B are denoted simply as "connection module 20".

The connection module 20 includes bus bars 21 connected between the electrode terminals 14, multiple box-shaped housing units 22 that insulate and house the bus bars 21, and multiple (in the present embodiment, three) U-springs 30.

The housing unit 22 and the U-spring 30 are formed integrally with synthetic resin, for example.

Note that the housing unit 22 and the U-springs 30 need not necessarily be formed integrally with synthetic resin. Also, in the present embodiment, examples are shown in which the first connection module 20A includes three housing units 22 and the second connection module 20B includes two housing units 22, but the number of housing units 22 is not limited thereto. For example, the first connection module 20A may include 24 housing units 22 and the second connection module 20B may include 23 housing units 22.

Figure 4:
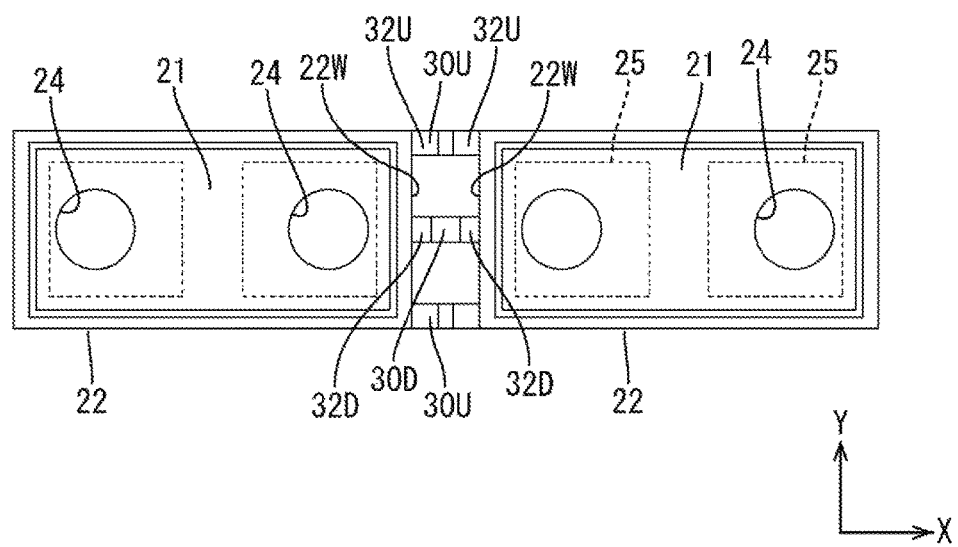
FIG. 4 is a schematic plan view showing the connection module.

Note that the portions corresponding to the terminal insertion holes 24 of the bus bars 21 on the lower surfaces of the housing units 22 are opening windows 25 (see FIG. 4).

Figure 3:
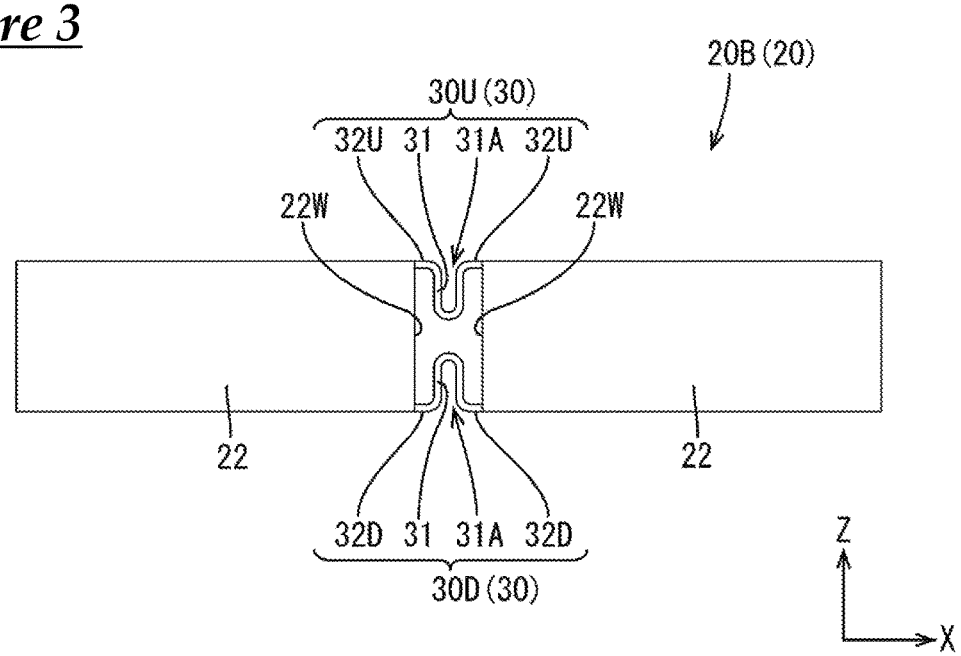
FIG. 3 is a side view of the connection module according to an embodiment.

As shown in FIGS. 3 and 4, three U-springs 30 serving as bendable portions are provided between a pair of opposing wall portions 22W of adjacent housing units 22. As shown in FIG. 3, each of the U-springs 30 is U-shaped in side view and couple adjacent housing units 22 such that the distance between the adjacent housing units can be extended or contracted.

As shown in FIG. 3, in a side view in a state of being provided on the pair of wall portions 22W, the U-springs 30 include a downward U-spring 30D with a U-portion having an opening 31A that faces downward and upward U-springs 30U with U-portions having openings 31A that face upward. Note that hereinafter, in descriptions that apply to both of the U-springs 30D and 30U, the U-springs 30D and 30U are denoted simply as "U-springs 30". Also, reference sign "D" denotes a configuration corresponding to the downward U-spring 30D, and reference sign "U" denotes a configuration corresponding to the upward U-spring 30U.

The U-springs 30 each include a U-portion 31 and a pair of base end portions 32 that are located on both ends of the U-portion 31 and connect to the pair of wall portions 22W. In a side view in a state of being provided on the pair of wall portions 22W, the three U-springs 30 include at least two U-springs 30 whose pairs of base end portions 32 are at different positions in the height direction (direction of arrow Z in FIG. 3). In the present embodiment, as shown in FIGS. 3 and 4, the three U-springs 30 are constituted by two upward U-springs 30U and one downward U-spring 30D.

Figure 5:
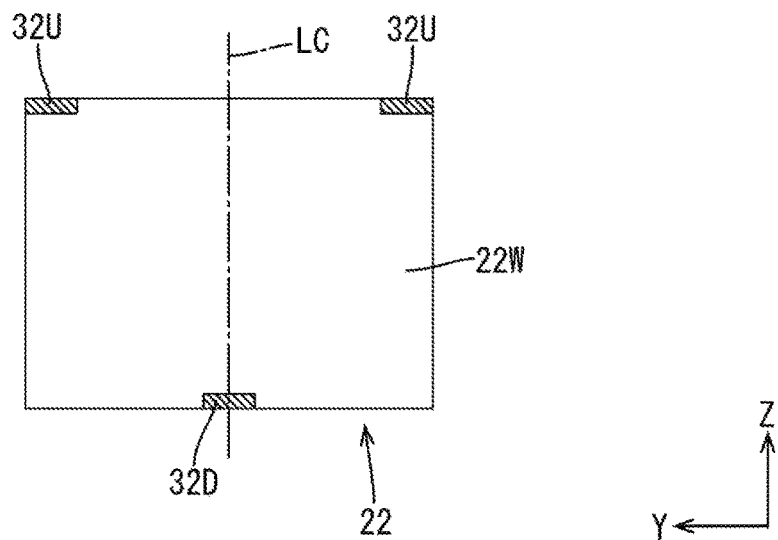
FIG. 5 is a diagram showing positions of base end portions of U-springs in a wall portion.
Figure 6:
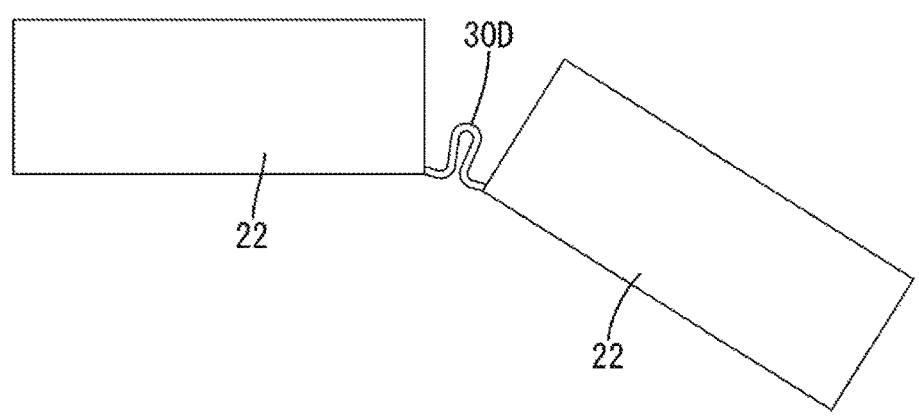
FIG. 6 is a side view showing sagging of a connection module in a comparative example.
Figure 7:
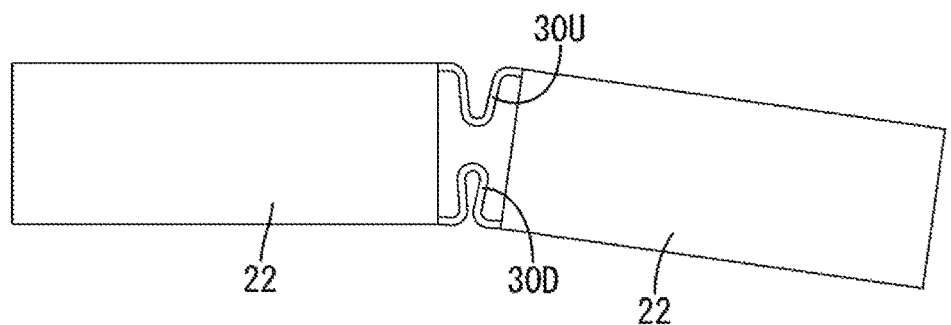
FIG. 7 is a side view showing sagging of the connection module according to an embodiment.

In other words, as shown in FIGS. 4 and 5, the upward U-springs 30U are provided at the two end portions of the wall portions 22W in plan view, and the downward U-springs 30D are provided at the center of the wall portion 22W in plan view. More specifically, as shown in FIG. 5, the base end portions 32U of the two upward U-springs 30U are located on the two end portions on the upper ends of the wall portions 22W, and the base end portions 32D of the one downward U-spring 30D are located at the central portions on the lower ends of the wall portions 22W.

Also, as shown in FIG. 5, the multiple (in the present embodiment, three) U-springs 30 are arranged such that the positions of the base end portions 32 that connect to the wall portions 22W are symmetrical with respect to a center line (center line in the direction of arrow Z in FIG. 5) in the height direction of the wall portions. Note that the configuration of the multiple U-springs 30 provided between the adjacent housing units 22 is not limited to this. For example, the downward U-springs 30D may be arranged at both end portions on the lower sides of the wall portions 22W instead of at the central portions on the lower ends of the wall portions 22W. Also, the downward U-springs 30D need not be provided symmetrically with respect to the center line LC.

The housing units 22 and the U-springs 30 of the connection module 20 are formed integrally, for example, through injection molding of synthetic resin in a mold. Also, the multiple power storage elements 11 are aligned such that adjacent electrode terminals 14 have opposite polarities. Next, the connection module 20 is mounted on the surface on which the electrode terminals 14 are formed. At this time, when the electrode terminals 14 of the power storage element group 10 are inserted into the terminal insertion holes 24 of the bus bars 21 and the electrode terminals 14 are fixed by nuts (not shown), the power storage module M1 shown in FIG. 1 is obtained.

Three (multiple) U-springs 30 serving as bendable portions are provided between the housing units 22. At this time, the three U-springs 30 include at least two U-springs 30 whose pairs of base end portions 32 are at different positions in the height direction, in a side view in a state of being provided on the pair of wall portions 22W.

Specifically, the U-springs 30 are arranged such that one downward U-spring 30D and two upward U-springs 30U are shifted in the height direction on the wall portions 22W of the housing units. Accordingly, for example, compared to the case where one downward U-spring 30 is provided on the wall portions (see FIG. 6), it is possible to suppress sagging of the multiple coupled housing units 22 (see FIGS. 6 and 7). In other words, according to the present embodiment, three U-springs 30 are provided between the adjacent housing units 22, and therefore positional movement of each housing unit 22 can be performed independently. Also, due to the three U-springs 30 having different arrangement positions and opening directions, it is possible to suppress a case in which the one end portion of the connection module 20 constituted by the multiple housing units 22 sags.

Also, the three U-springs 30 are constituted by including the downward U-spring 30D and the upward U-spring 30U. Thus, the bendable portion is constituted by including the downward U-spring 30D and the upward U-springs 30U that are provided between the housing units, and thus it is possible to prevent a case in which one end portion of the connection module 20 sags without causing the U-springs 30 to protrude in the vertical direction of the housing unit 22 in a side view (see FIG. 3). By not causing the U-springs 30 to protrude in the vertical direction of the housing unit 22, the dimension in the height direction (direction of arrow Z in FIG. 3) of the connection module 20 is not increased by the U-springs 30, and by extension, this contributes to reducing the size of the power storage module M1.

Figure 8:
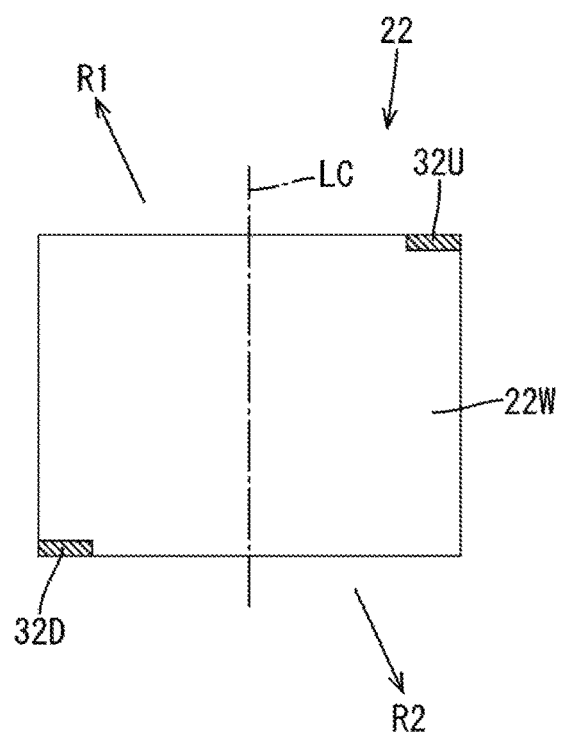
FIG. 8 is a diagram showing positions of base end portions of U-springs in a wall portion of a comparative example.

Also, as shown in FIG. 5, the multiple U-springs 30 are arranged such that the positions of the base end portions 32 connected to the wall portions 22W are symmetrical with respect to the center line LC in the height direction of the wall portions. Specifically, the two upward U-springs 30U are provided such that the base end portions 32U are located on the two end portions on the respective upper ends of the wall portions 22W. Also, the one downward U-spring 30D is provided such that the base end portions 32D are located at the central portions on the lower ends of the wall portions 22W. For this reason, in the configuration with three U-springs 30, which is a small number of U-springs 30, bending in the twisting direction (the directions of arrows R1 and R2 in FIG. 8) of the multiple coupled housing units can be suppressed, and sagging of the connection module can be suppressed. As shown in FIG. 8, for example, the multiple U-springs 30 are more likely to bend in the twisting direction if they are not arranged symmetrically. When bending in the twisting direction occurs, a rotational force acts on the housing unit 22, which complicates the task of attaching the housing unit 22.

Other Embodiments

The present invention is not limited to the embodiment described according to the above description and drawings, and for example, the following embodiments are also included in the technical scope of the present invention.

Figure 9A:
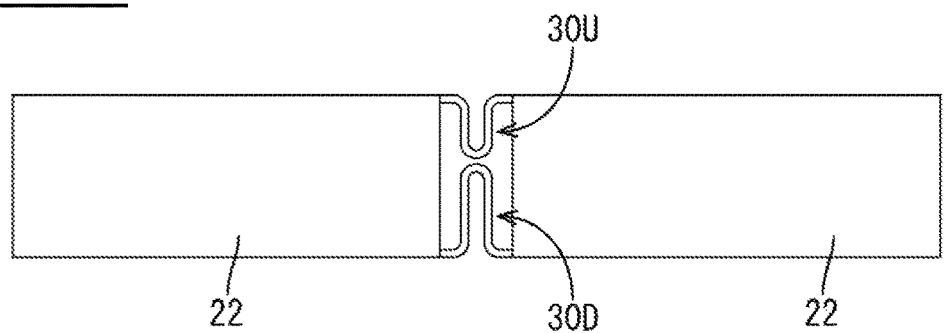
FIG. 9A is a side view showing a connection module according to another embodiment.
Figure 9B:
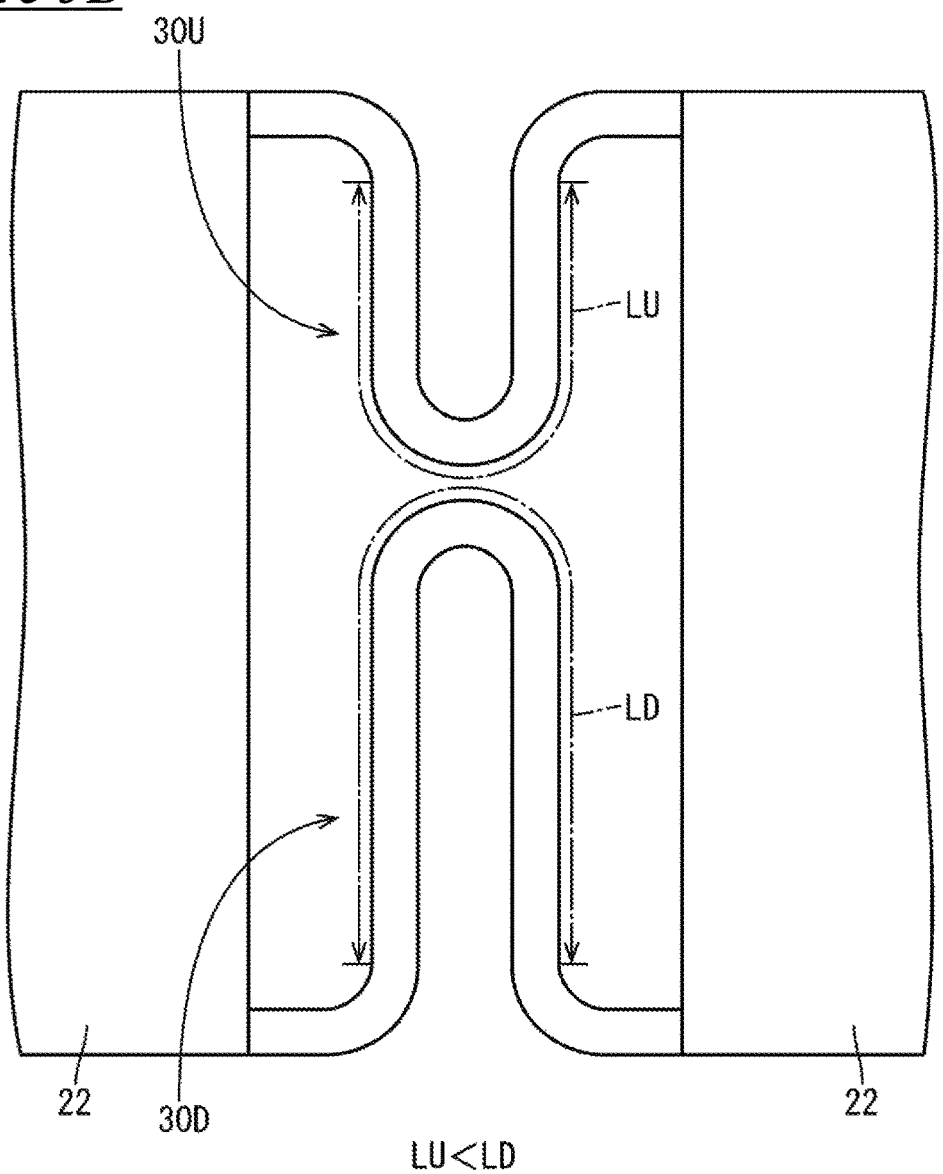
FIG. 9B is a partially enlarged view of FIG. 9A.

In the above-described embodiment, an example has been given in which the length (spring length) LD of the U-portion 31 of the downward U-spring 30D and the length (spring length) LU of the U-portion 31 of the upward U-springs 30U are equal, but there is no limitation thereto. As shown in FIGS. 9A and 9B, a configuration may be used in which the spring length LD of the downward U-spring 30D is longer than the spring length LU of the upward U-springs 30U.

In this case, by making the spring length LD of the downward U-spring longer than the spring length LU of the upward U-springs, the opening degree of the U-portion 31 of the upward U-springs is smaller than the opening degree of the U-portion 31 of the downward U-spring when a weight that is equal to that in the case where the spring length LD and the spring length LU are equal is applied to the housing unit 22. Accordingly, it is possible to make the downward bending amount of the connection module 20 smaller than the upward bending amount in comparison to the case where the spring length LD and the spring length LU of the U-portions 31 are equal. For this reason, sagging of the connection module can be further suppressed.

Figure 10:
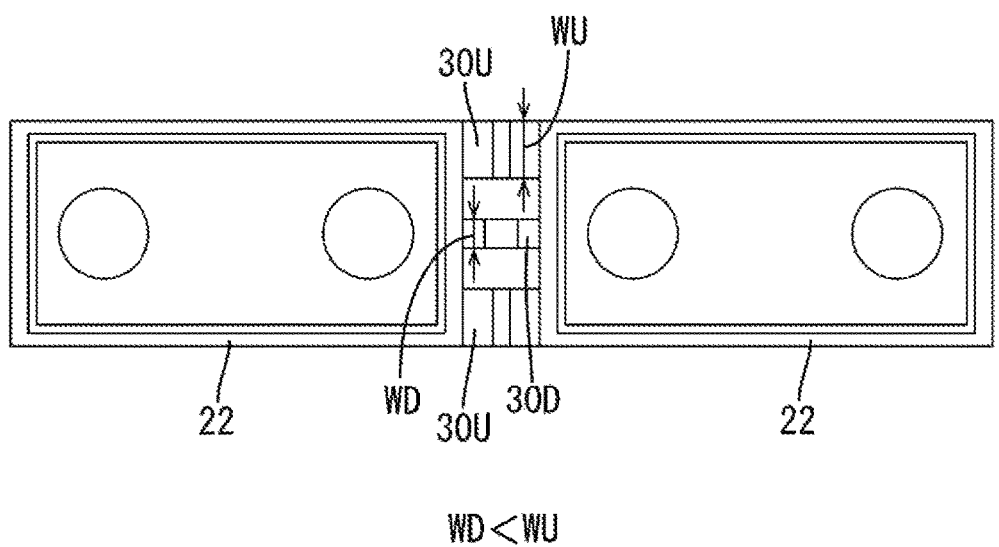
FIG. 10 is a plan view showing a connection module of another embodiment.

In the above-described embodiment, an example has been given in which the spring width WD of the downward U-spring 30D and the spring width WU of the upward U-springs 30U are equal, but there is no limitation thereto. As shown in FIG. 10, it is possible to use a configuration in which the spring length WU of the upward U-springs 30U is wider than the spring width WD of the downward U-spring 30D.

In this case, by making the spring width WU of the upward U-springs wider than the spring width WD of the downward U-spring, the spring force (force of attempting to maintain the opening width of the U-portion 31) of the upward U-springs 30U is stronger than the spring force of the downward U-spring 30D, and the opening degree of the U-portions 31 of the upward U-springs is smaller than the opening degree of the U-portion 31 of the downward U-spring. Accordingly, similarly to the case in which the above-described spring lengths L are not equal, the downward bending amount of the connection module can be made smaller than the upward bending amount. For this reason, sagging of the connection module can be further suppressed.

In the above-described embodiment, an example has been given in which the U-springs 30 include the downward U-spring 30D and the upward U-springs 30U, but there is no limitation thereto. For example, the U-springs 30 may be constituted by only downward U-springs 30D.

In this case as well, by using a configuration including at least two downward U-springs 30D with different positions in the height direction, it is possible to suppress sagging of the connection module, compared to the configuration in which multiple U-springs with the same position in the height direction are used. In short, it is sufficient to use a configuration in which the multiple U-springs include at least two U-springs with different positions in the height direction.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

10 Power storage element group
11 Power storage element
14A Positive electrode terminal
14B Negative electrode terminal
20 Connection module
20A First connection module (connection module)
20B Second connection module (connection module)
21 Bus bar
22 Housing unit
22W Wall portion
30 U-spring
30D Downward U-spring (U-spring)
30U Upward U-spring (U-spring)
31 U-portion of U-spring
31A Opening of U-portion
32 Base end portion of U-spring
M1 Power storage module

What is claimed is:

1. A connection module to be attached to a power storage element group formed by aligning a plurality of power storage elements having positive and negative electrode terminals, comprising:
   bus bars to be connected between the electrode terminals;
   a plurality of box-shaped housing units for insulating and housing the bus bars; and
   a plurality of U-springs that are provided between a pair of opposing wall portions of adjacent housing units, that are U-shaped in a side view, and that couple the adjacent housing units such that a distance between the adjacent housing units can extend and contract,
   wherein the U-springs each include a U-portion and a pair of base end portions that are located on both ends of the U-portion and connect to the pair of wall portions, and
   the plurality of U-springs include at least two U-springs in which the pairs of base end portions are at different positions in a height direction, in a side view in a state of being provided on the pair of wall portions.

2. The connection module according to claim 1, wherein the plurality of U-springs include a downward U-spring in which the U-portion has an opening that faces downward, and an upward U-spring in which the U-portion has an opening that faces upward, in a plan view in a state of being provided on the pair of wall portions.

3. The connection module according to claim 2, wherein a spring length of the downward U-spring is longer than a spring length of the upward U-spring.

4. The connection module according to claim 2, wherein a spring width of the upward U-spring is wider than a spring width of the downward U-spring.

5. The connection module according to claim 2, wherein the upward U-spring is provided on both end portions on the wall portions in plan view, and
one said downward U-spring is provided at a central portion of the wall portions in plan view.

6. The connection module according to claim 1, wherein the plurality of U-springs are arranged such that the positions of the base end portions connected to the wall portions are symmetrical with respect to a center line in the height direction of the wall portions.

\* \* \* \* \*